US010637069B2

(12) United States Patent
Sode et al.

(10) Patent No.: US 10,637,069 B2
(45) Date of Patent: Apr. 28, 2020

(54) CARBON SHEET, GAS DIFFUSION ELECTRODE SUBSTRATE, WOUND BODY, AND FUEL CELL

(71) Applicant: TORAY INDUSTRIES, INC., Tokyo (JP)

(72) Inventors: Katsuya Sode, Otsu (JP); Toru Sugahara, Nagoya (JP); Takashi Ando, Otsu (JP)

(73) Assignee: TORAY INDUSTRIES, INC., Tokyo (JP)

(*) Notice: Subject to any disclaimer, the term of this patent is extended or adjusted under 35 U.S.C. 154(b) by 87 days.

(21) Appl. No.: 15/767,503

(22) PCT Filed: Oct. 11, 2016

(86) PCT No.: PCT/JP2016/080089
§ 371 (c)(1),
(2) Date: Apr. 11, 2018

(87) PCT Pub. No.: WO2017/069014
PCT Pub. Date: Apr. 27, 2017

(65) Prior Publication Data
US 2018/0301712 A1    Oct. 18, 2018

(30) Foreign Application Priority Data

Oct. 22, 2015  (JP) .................................. 2015-207693

(51) Int. Cl.
*H01M 4/86* (2006.01)
*C04B 35/83* (2006.01)
(Continued)

(52) U.S. Cl.
CPC ............. *H01M 4/8652* (2013.01); *B32B 5/28* (2013.01); *C04B 35/83* (2013.01); *C04B 38/00* (2013.01);
(Continued)

(58) Field of Classification Search
CPC ............. H01M 4/8652; H01M 4/8605; H01M 4/8807; H01M 4/861; H01M 4/8636;
(Continued)

(56) References Cited

U.S. PATENT DOCUMENTS 9,716,278 B2    7/2017 Tatsuno
9,859,572 B2 *  1/2018 Fisher ................. H01M 4/8673
(Continued)

FOREIGN PATENT DOCUMENTS

JP    07134993 A    5/1995
JP    09157065 A    6/1997
(Continued)

OTHER PUBLICATIONS

International Search Report and Written Opinion for International Application No. PCT/JP2016/080089, dated Nov. 15, 2016, 5 pages.
(Continued)

*Primary Examiner* — Amanda C. Walke
(74) *Attorney, Agent, or Firm* — RatnerPrestia

(57) ABSTRACT

The purpose of the present invention is to provide a carbon sheet that is suitably employed in a gas-diffusion-electrode substrate that has excellent flooding resistance and with which it is possible to suppress internal peeling of the carbon sheet. In order to achieve the aforementioned purpose, the present invention has the following configuration. Specifically, provided is a porous carbon sheet containing carbon fibers and a binder, wherein, in a section between a surface on one side of the carbon sheet and a surface on the other side thereof, when layers obtained by dividing, under compression, the carbon sheet into six equal parts in the thickness direction are assumed to be layer 1, layer 2, layer 3, layer 4, layer 5, and layer 6, in order starting from the layer including the surface on the one side to the layer including the surface on the other side, the layer in which the packing
(Continued)

ratio under compression is the greatest is layer 2, and the relationships of the packing ratios under compression among layer 2, layer 3, layer 4, layer 5, and layer 6 are such that layer 2 has the greatest packing ratio, and layer 3 has the second-greatest packing ratio.

10 Claims, 1 Drawing Sheet

(51) Int. Cl.
*H01M 4/96* (2006.01)
*C04B 38/00* (2006.01)
*B32B 5/28* (2006.01)
*C04B 38/06* (2006.01)
*H01M 8/0234* (2016.01)
*H01M 8/0243* (2016.01)
*H01M 8/0245* (2016.01)
*H01M 8/10* (2016.01)
*H01M 4/88* (2006.01)

(52) U.S. Cl.
CPC ............ *C04B 38/06* (2013.01); *H01M 4/861* (2013.01); *H01M 4/8636* (2013.01); *H01M 4/8642* (2013.01); *H01M 4/8657* (2013.01); *H01M 4/96* (2013.01); *H01M 8/0234* (2013.01); *H01M 8/0243* (2013.01); *H01M 8/0245* (2013.01); *B32B 2262/106* (2013.01); *B32B 2457/18* (2013.01); *H01M 4/8605* (2013.01); *H01M 4/8807* (2013.01); *H01M 8/10* (2013.01)

(58) Field of Classification Search
CPC ... H01M 4/8642; H01M 4/8657; C04B 35/83; B32B 2262/106; B32B 2457/18; B32B 5/28
USPC .......................................... 429/480
See application file for complete search history.

(56) References Cited

U.S. PATENT DOCUMENTS

| | | | |
|---|---|---|---|
| 2006/0046926 A1* | 3/2006 | Ji ...................... | H01M 4/8605 502/101 |
| 2007/0015042 A1* | 1/2007 | Ji .......................... | B32B 3/30 429/509 |
| 2017/0244108 A1* | 8/2017 | Sode .................... | H01M 4/96 |

FOREIGN PATENT DOCUMENTS

| | | |
|---|---|---|
| JP | 2007176750 A | 7/2007 |
| JP | 2007268735 A | 10/2007 |
| JP | 2009176610 A | 8/2009 |
| JP | 2009234851 A | 10/2009 |
| JP | 2013145640 A | 7/2013 |
| JP | 2014207240 A | 10/2014 |
| WO | 2013057483 A1 | 4/2013 |
| WO | 2016060044 A1 | 4/2016 |

OTHER PUBLICATIONS

Extended European Search Report for European Application No. 16 857 329.3, dated Nov. 27, 2018, 7 pages.

* cited by examiner

[Fig 1]
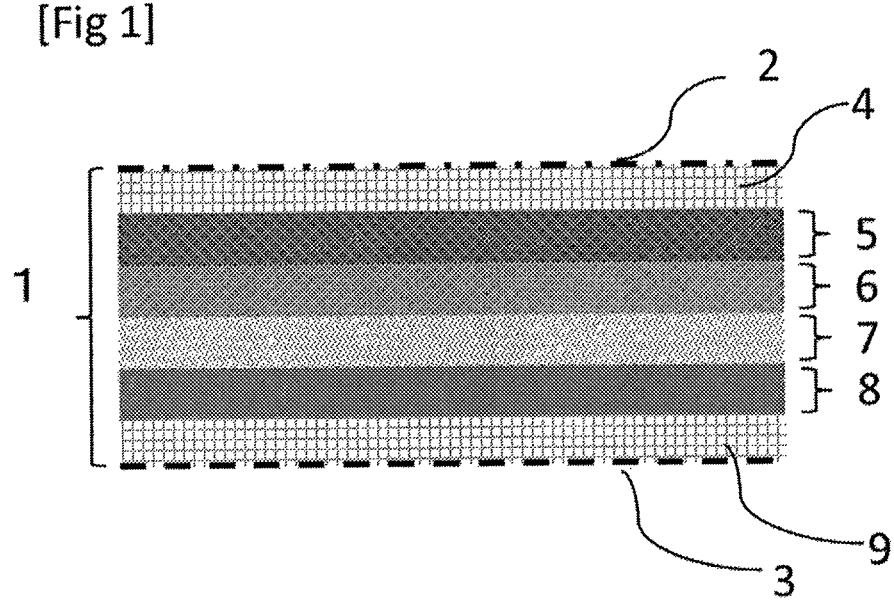
[Fig 2]
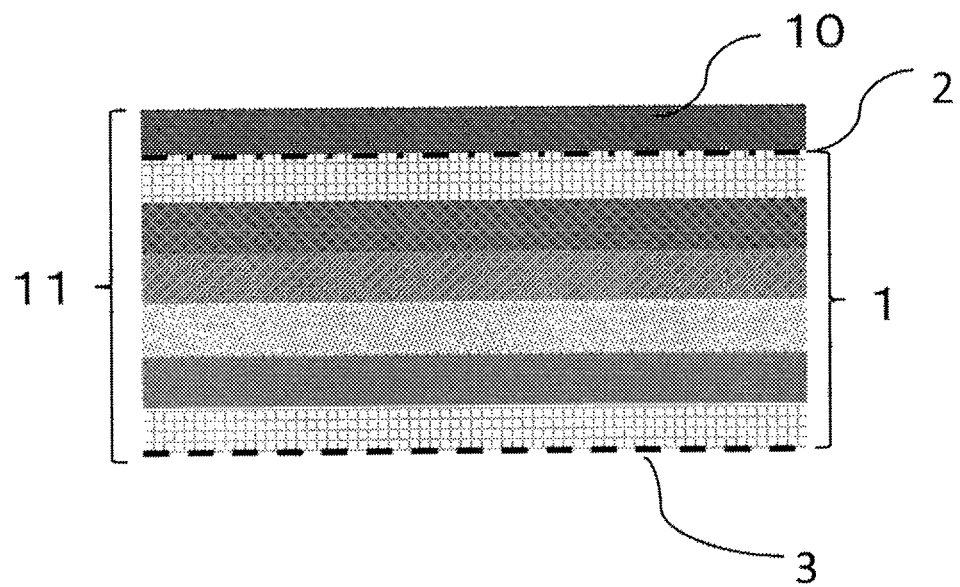

CARBON SHEET, GAS DIFFUSION ELECTRODE SUBSTRATE, WOUND BODY, AND FUEL CELL

CROSS REFERENCE TO RELATED APPLICATIONS

This is the U.S. National Phase application of PCT/JP2016/080089, filed Oct. 11, 2016, which claims priority to Japanese Patent Application No. 2015-207693, filed Oct. 22, 2015, the disclosures of these applications being incorporated therein by reference in their entireties for all purposes.

TECHNICAL FIELD OF THE INVENTION

The present invention relates to a carbon sheet which is suitably used in a fuel cell, particularly in a polymer electrolyte fuel cell; a gas diffusion electrode substrate further including a microporous layer; a wound body; and a fuel cell including the gas diffusion electrode substrate.

BACKGROUND OF THE INVENTION

A polymer electrolyte fuel cell in which a hydrogen-containing fuel gas and an oxygen-containing oxidizing gas are supplied to an anode and a cathode, respectively, and an electromotive force is generated by an electrochemical reaction occurring at the electrodes is generally constituted by laminating a bipolar plate, a gas diffusion electrode substrate, a catalyst layer, an electrolyte membrane, a catalyst layer, a gas diffusion electrode substrate and a bipolar plate in this order. The gas diffusion electrode substrate is required to have high gas diffusivity for allowing a gas supplied from the bipolar plate to be diffused into a catalyst layer and high water removal performance for discharging water generated by the electrochemical reaction to the bipolar plate, as well as high electrical conductivity for extracting generated electric current. Thus, gas diffusion electrode substrates are widely used in which a microporous layer is formed on a surface of a substrate that is a carbon sheet composed of a carbon fiber etc.

However, such gas diffusion electrode substrates have the following problems: (1) when the polymer electrolyte fuel cell is operated at a relatively low temperature of below 70° C. in a high current density region, as a result of blockage of the gas diffusion electrode substrate by water generated in a large amount and shortage in the gas supply, the fuel cell performance is impaired (this problem is hereinafter referred to as "flooding"); and (2) the carbon sheet that forms the gas diffusion electrode substrate is delaminated in the thickness direction in a production process of the fuel cell, which causes a problem when the carbon sheet is conveyed, or generated water is retained in the delaminated part of the carbon sheet during electrical power generation, so that the fuel cell performance is impaired. Thus, the gas diffusion electrode substrate is desired to have mechanical strength required as the gas diffusion electrode substrate while exhibiting high generated water removal performance and delamination resistance.

There has been proposed a fuel cell gas diffusion electrode substrate capable of preventing deterioration of the fuel cell performance owing to the resin density of the carbon sheet which is continuously decreased in the thickness direction (Patent Document 1).

There has also been proposed a gas diffusion electrode substrate capable of preventing deterioration of the fuel cell performance without having a microporous layer, owing to a high-density region in a region of 40 μm in thickness from the surface of the carbon sheet, and a low-density region in the middle of the carbon sheet (Patent Document 2).

In addition, there has been proposed a carbon sheet capable of preventing deterioration of performance of the fuel cell, the carbon sheet including a laminate of two sheets different in resin density and having different pore diameters in the thickness direction (Patent Document 3).

PATENT DOCUMENTS

Patent Document 1: Japanese Patent Laid-open Publication No. 2013-145640
Patent Document 2: Japanese Patent Laid-open Publication No. 2014-207240
Patent Document 3: Japanese Patent Laid-open Publication No. 2009-234851

SUMMARY OF THE INVENTION

However, in the inventions described in Patent Documents 1 and 2, since one surface of the carbon sheet has the highest density, when a microporous layer is provided, the microporous layer does not penetrate into the carbon sheet and an interface is formed between the microporous layer and the carbon sheet. Therefore, the inventions still have the problem that water, when generated, is easily retained in the interface, so that marked flooding occurs.

In addition, the invention described in Patent Document 3 still has the problem that since the carbon sheet is obtained by laminating two sheets, not only delamination easily occurs at a lamination interface, but also water, when generated, is easily retained in the lamination interface, so that marked flooding occurs.

Thus, in view of the background of the conventional techniques, an object of the present invention is to provide a carbon sheet suitable for use in a gas diffusion electrode substrate which has an excellent anti-flooding characteristic that has been heretofore difficult to achieve, and can suppress internal delamination of the carbon sheet.

Another object of the present invention is to provide a gas diffusion electrode substrate obtained using the above-mentioned carbon sheet as a substrate, a wound body which is the carbon sheet or the gas diffusion electrode substrate wound up, and a fuel cell including the gas diffusion electrode substrate.

Embodiments of the present invention are as follows.

A porous carbon sheet including a carbon fiber and a binding material, wherein
when layers obtained by dividing the carbon sheet in a thickness direction into six equal parts under compression within a section extending from, one surface to the other surface include a layer 1, a layer 2, a layer 3, a layer 4, a layer 5 and a layer 6 in this order from the layer including one surface to the layer including the other surface, a layer having the largest filling rate under compression is the layer 2, and
the filling rates of the layer 2, the layer 3, the layer 4, the layer 5 and the layer 6 under compression satisfy the relationship of: the layer 2 has the largest filling rate, and the layer 3 has the second largest filling rate.

According to the present invention, a carbon sheet suitable for use in a gas diffusion electrode substrate which has an excellent anti-flooding characteristic that has been heretofore difficult to achieve, and which can suppress internal delamination of the carbon sheet.

BRIEF DESCRIPTION OF THE DRAWINGS

FIG. 1 is a schematic sectional view for explaining a configuration of the carbon sheet of the present invention.

FIG. 2 is a schematic sectional view for explaining a configuration of a gas diffusion electrode substrate including the carbon sheet of the present invention.

DETAILED DESCRIPTION OF CERTAIN EMBODIMENTS OF THE INVENTION

The carbon sheet of the present invention is a porous carbon sheet including a carbon fiber and a binding material, wherein when layers obtained by dividing the carbon sheet in a thickness direction into six equal parts under compression within a section extending from one surface to the other surface include a layer 1, a layer 2, a layer 3, a layer 4, a layer 5 and a layer 6 in this order from the layer including one surface to the layer including the other surface, a layer having the largest filling rate under compression is the layer 2, and the filling rates of the layer 2, the layer 3, the layer 4, the layer 5 and the layer 6 under compression satisfy the relationship of: the layer 2 has the largest filling rate, and the layer 3 has the second largest filling rate.

In the present invention, the filling rate represents a filling rate under compression even when simply described as a "filling rate". In other words, the "filling rate of the layer 1" and the "filling rate of the layer 1 under compression" both represent a filling rate of the layer 1 under compression.

Hereinafter, the carbon sheet, the gas diffusion electrode substrate, the wound body, and the fuel cell according to the present invention will be described in detail.

First, the configurations of the carbon sheet and the gas diffusion electrode substrate in the present invention will be described with reference to the drawings. FIG. 1 is a schematic sectional view for explaining a configuration of the carbon sheet of the present invention. FIG. 2 is a schematic sectional view for explaining a configuration of a gas diffusion electrode substrate including the carbon sheet of the present invention.

In FIG. 1, when layers obtained by dividing the carbon sheet in a thickness direction into six equal parts under compression within a section extending from one surface (surface 1 (2)) to the other surface (surface 6 (3)) include a layer 1 (4), a layer 2 (5), a layer 3 (6), a layer 4 (7), a layer 5 (8) and a layer 6 (9) in this order from the layer including one surface (surface 1 (2)) to the layer including the other surface (surface 6 (3)), a layer having the largest filling rate under compression is the layer 2, and the filling rates of the layer 2, the layer 3, the layer 4, the layer 5 and the layer 6 under compression satisfy the relationship of: the layer 2 has the largest filling rate, and the layer 3 has the second largest filling rate. Thus, the carbon sheet (1) of the present invention includes the layer 1 (4), the layer 2 (5), the layer 3 (6), the layer 4 (7), the layer 5 (8) and the layer 6 (9).

FIG. 2 illustrates a configuration of a gas diffusion electrode substrate (11) that can be obtained by forming a microporous layer (10) on the surface 1 (2) being one surface of the carbon sheet (1) in FIG. 1. The microporous layer (10) can be structured to be partially filled into the carbon sheet (1).

[Carbon Sheet]

The carbon sheet of the present invention is a porous carbon sheet including a carbon fiber and a binding material, and can be subjected to a hydrophobic treatment as necessary.

In the present invention, the binding material represents components other than the carbon fiber in the carbon sheet. Thus, the binding material includes a carbide of a resin composition that is a material serving to bind carbon fibers. When a hydrophobic material is used in the carbon sheet of the present invention, the hydrophobic material is included in the binding material.

It is important that the carbon sheet of the present invention be porous for exhibiting high gas diffusivity for allowing a gas supplied from a bipolar plate to be diffused into a catalyst layer and high water removal performance for discharging water generated by an electrochemical reaction to the bipolar plate. Further, the carbon sheet of the present invention preferably has high electrical conductivity for extracting generated electric current. Thus, for obtaining a carbon sheet, a porous material having electrical conductivity is preferably used. More specifically, as the porous material to be used for obtaining a carbon sheet, for example, a porous material including a carbon fiber, such as a carbon fiber woven material, carbon paper or a carbon fiber nonwoven fabric, or a carbonaceous foamed porous material including a carbon fiber is preferably used.

In particular, for obtaining a carbon sheet, a porous material including a carbon fiber is preferably used because of its excellent corrosion resistance. Further, carbon paper obtained by binding a carbon fiber papermaking substrate to a carbide (binding material) is preferably used because it is excellent in the property of absorbing a change in dimension of an electrolyte membrane in the thickness direction, i.e. "spring property".

The carbon sheet of the present invention is preferably produced continuously on a roll-to-roll system because the system reduces production cost.

In the present invention, when layers obtained by dividing the carbon sheet in a thickness direction into six equal parts under compression within a section extending from one surface to the other surface include a layer 1, a layer 2, a layer 3, a layer 4, a layer 5 and a layer 6 in this order from the layer including one surface to the layer including the other surface, a layer having the largest filling rate under compression is the layer 2. In addition, the filling rates of the layer 2, the layer 3, the layer 4, the layer 5 and the layer 6 under compression satisfy the relationship of: the layer 2 has the largest filling rate, and the layer 3 has the second largest filling rate. The following is an example of determining whether or not the layer 2 has the largest filling rate, and the layer 3 has the second largest filling rate in the relationship of the filling rates of the layer 2, the layer 3, the layer 4, the layer 5 and the layer 6 under compression. For example, in the case where the filling rates of the layer 1, the layer 2, the layer 3, the layer 4, the layer 5 and the layer 6 are 28%, 30%, 27%, 30%, 25% and 22%, respectively, the layer 2 and the layer 4 have the largest filling rate, and the layer 3 has the third largest filling rate among the layer 2, the layer 3, the layer 4, the layer 5 and the layer 6.

In the carbon sheet, when the layer 2 has the largest filling rate, and the layer 3 has the second largest filling rate among the layer 2, the layer 3, the layer 4, the layer 5, and the layer 6, the pore diameter of the layers increases inversely in the order of the layer 2, the layer 3, and so on, so that generated water is quickly discharged. In addition, since the filling rate of the layer 1 is smaller than the filling rate of the layer 2, when a microporous layer is provided, the microporous layer penetrates into the carbon sheet properly, and an interface between the microporous layer and the carbon sheet is not formed. Therefore, retention of generated water in the interface can be prevented.

In the carbon sheet of the present invention, preferably, the filling rates of the layer 2, the layer 3, the layer 4, the layer 5 and the layer 6 under compression satisfy the relationship of: filling rate of layer 2>filling rate of layer 3>filling rate of layer 4>filling rate of layer 5>filling rate of layer 6. When the filling rates of the layer 2, the layer 3, the layer 4, the layer 5 and the layer 6 under compression satisfy the relationship of: filling rate of layer 2>filling rate of layer 3>filling rate of layer 4>filling rate of layer 5>filling rate of layer 6, a layer having a small filling rate does not exist in the middle of the carbon sheet in the thickness direction, the delamination stress is not concentrated in the layers, and delamination resistance is more enhanced. It is possible to attain an anti-flooding characteristic and delamination resistance easily by arranging the layers in such a manner that the filling rates of the layers decrease in the order of the layer 2, the layer 3, the layer 4, the layer 5 and the layer 6.

In addition, the layer 1 preferably has the third or fourth largest filling rate among the filling rates of the layers 1 to 6. In this case, fluffing of the carbon fiber on the surface 1 can be suppressed. Accordingly, it is particularly preferred in the carbon sheet of the present invention that the filling rates of the layer 1, the layer 2, the layer 3, the layer 4, the layer 5 and the layer 6 under compression satisfy the relationship of: filling rate of layer 2>filling rate of layer 3>filling rate of layer 1>filling rate of layer 4>filling rate of layer 5>filling rate of layer 6, or filling rate of layer 2>filling rate of layer 3>filling rate of layer 4>filling rate of layer 1>filling rate of layer 5>filling rate of layer 6.

The carbon sheet of the present invention in which the layer 2 has the largest filling rate, and the layer 3 has the second largest filling rate among the layer 2, the layer 3, the layer 4, the layer 5 and the layer 6 can be obtained by a method of controlling, in the thickness direction of the carbon sheet, the mean diameter of monofilaments of the carbon fiber that forms the carbon sheet, the density of the carbon sheet, or the distribution of the binding material. Among them, the method of controlling the distribution of the binding material in the thickness direction of the carbon sheet is more preferred, and the method of controlling the distribution with a carbide of a resin composition is particularly preferred.

The method of controlling the distribution of the binding material in the thickness direction (also referred to as a through-plane direction) may be a method in which three prepregs, that are each obtained by impregnating a resin composition into a porous material such as a carbon fiber papermaking substrate prepared by the method as described below and that are different in amount of the impregnated resin composition, are prepared, laminated and molded, and carbonized to control the distribution, or a method in which one prepreg, which is made to have a distribution in the adhesion amount of resin by using a resin addition method in which a distribution is formed in the adhesion amount of a resin composition in impregnation of the resin composition into a porous material such as a carbon fiber papermaking substrate, is provided, and molded without being laminated, and is carbonized to control the distribution. When the carbon sheet is obtained by the method in which prepregs different in amount of the impregnated resin composition are laminated, a rapid change in filling rate occurs at the lamination interface, so that generated water is easily retained at the interface without being smoothly discharged, and therefore of the above-mentioned methods, the method in which the carbon sheet is prepared from one prepreg is preferred because such a rapid change in filling rate does not occur. The method in which the carbon sheet is prepared from one prepreg rather than a plurality of prepregs are laminated facilitates reduction of the thickness of the resulting carbon sheet, and is therefore suitable for adjusting the thickness to fall within a preferred range.

The carbon sheet of the present invention preferably has a difference in filling rate between the layer 2 and the layer 1 (filling rate of layer 2–filling rate of layer 1) of 5% or more. When the difference in filling rate between the layer 2 and the layer 1 is 5% or more, an anti-flooding characteristic and suppression of delamination in the carbon sheet are easily attained. Since the filling rate of the layer 1 is smaller than the filling rate of the layer 2, when a microporous layer is provided, the microporous layer penetrates into the carbon sheet properly, and an interface between the microporous layer and the carbon sheet is not formed. Accordingly, water, when generated, is not retained easily in the interface. The upper limit of the difference in filling rate between the layer 2 and the layer 1 is not particularly limited, but the difference in filling rate is preferably 20% or less when considering strength required in use of the carbon sheet in post-processing and stacking of fuel cells.

The carbon sheet of the present invention preferably has differences in filling rate between the layer 2 and each of the layers 4 to 6 (filling rate of layer 2–each of filling rates of layers 4 to 6) of each 5% or more. Herein, the differences in filling rate between the layer 2 and each of the layers 4 to 6 (filling rate of layer 2–each of filling rates of layers 4 to 6) are each 5% or more means that the difference in filling rate between the layer 2 and the layer 4 is 5% or more, the difference in filling rate between the layer 2 and the layer 5 is 5% or more, and the difference in filling rate between the layer 2 and the layer 6 is 5% or more. When differences in filling rate between the layer 2 and each of the layers 4 to 6 are each 5% or more, gradient of pore diameters between the layers increase, and generated water is discharged quickly and easily. The upper limits of the differences in filling rate between the layer 2 and each of the layers 4 to 6 are not particularly limited, but the differences are preferably 30% or less when considering strength required in use of the carbon sheet in post-processing and stacking of fuel cells.

The carbon sheet of the present invention preferably has a difference in filling rate between the layer 2 and the layer 3 (filling rate of layer 2–filling rate of layer 3) of 3% or more. When the difference in filling rate between the layer 2 and the layer 3 is 3% or more, water removal performance is significantly improved. The upper limit of the difference in filling rate between the layer 2 and the layer 3 is not particularly limited, but the difference is preferably 30% or less when considering strength required in use of the carbon sheet in post-processing and stacking of fuel cells.

It is preferred that the carbon sheet of present invention have the filling rates of the layers 1 to 6 of each 5 to 50%, preferably 5 to 45%, because the carbon sheet is well balanced in mechanical strength required for using the carbon sheet as a fuel cell gas diffusion electrode substrate. When the filling rate of each of the layers is 5% or more, the carbon sheet is inhibited from being ruptured by a force received from a bipolar plate in assembly of a fuel cell stack, and handling characteristics in production and high-order processing of the carbon sheet are improved. It is more preferred that the filling rate of each of the layers be 8% or more, because bending of the carbon sheet into the bipolar plate is prevented.

It is preferred that the carbon sheet of the present invention have the filling rate of the layer 2 of 10% or more and 50% or less. The filling rate of the layer 2 is more preferably 10% or more and 45% or less, still more preferably 15% or more and 35% or less, particularly preferably 20% or more and 30% or less. When the filling rate of the layer 2 is 50% or less, more preferably 45% or less, migration of substances in the carbon sheet is facilitated. It is more preferred that the filling rate of the layer 2 be 35% or less, because gas diffusion and discharge of generated water are efficiently performed, and especially when the filling rate of the layer 2 is 30% or less, such effects are remarkably exhibited. On the other hand, when the filling rate of the layer 2 is 10% or more, even if the other layers have a small filling rate, the carbon sheet has excellent mechanical strength required for using the carbon sheet as a fuel cell gas diffusion electrode substrate. In addition, it is still more preferred that the filling rate of the layer 2 be 15% or more, because conveyance of the carbon sheet on a roll-to-roll system is facilitated, and especially when the filling rate of the layer 2 is 20% or more, such an effect is remarkably exhibited.

The filling rate of the layer 1 is more preferably 10% or more and 20% or less. The filling rate of the layer 3 is more preferably 12% or more and 33% or less. The filling rate of the layer 4 is more preferably 10% or more and 30% or less. The filling rate of the layer 5 is more preferably 10% or more and 25% or less. The filling rate of the layer 6 is more preferably 10% or more and 20% or less.

When the filling rate of each of the layers is in a preferred range, both optimum mechanical strength and optimum fuel cell performance can be achieved.

In the carbon sheet of the present invention, when a surface included in the layer 6 is a surface 6, the surface 6 preferably has a surface coverage of 7% or less. It is preferred that the surface 6 have a surface coverage of 7% or less, because the binding material does not spread over the surface of the carbon sheet, discharge of generated water to a bipolar plate is less hindered, and an anti-flooding characteristic is enhanced. The lower limit of the surface coverage of the surface 6 is not particularly limited, but the surface coverage is preferably 4% or more when considering strength required in use of the carbon sheet in post-processing and stacking of fuel cells.

The carbon sheet of the present invention preferably has a thickness of 50 µm or more and 250 µm or less, more preferably 90 to 190 µm. When the carbon sheet has a small thickness of 250 µm or less, gas diffusivity is enhanced, and generated water is easily discharged. Further, the size of a fuel cell as a whole decreases, which is preferred. Meanwhile, the thickness of the carbon sheet is preferably 50 µm or more. This is because when the thickness of the carbon sheet is 50 µm or more, gas diffusion in a plane direction in the carbon sheet is efficiently performed, and fuel cell performance is easily improved.

In the present invention, the density of the carbon sheet is preferably within the range of 0.20 to 0.40 g/cm$^3$, more preferably within the range of 0.22 to 0.35 g/cm$^3$. When the density is 0.20 g/cm$^3$ or more, the mechanical properties of the carbon sheet are improved, so that the electrolyte membrane and the catalyst layer can be sufficiently supported. In addition, high electrical conductivity is attained, and the fuel cell performance is thus improved easily. Meanwhile, when the density is 0.40 g/cm$^3$ or less, water removal performance is improved easily, and flooding is thus suppressed easily. A carbon sheet having a density as described above can be obtained by controlling the areal weight of the carbon fiber, the adhesion amount of the resin component based on the amount of the carbon fiber, and the thickness of the carbon sheet as described below in a method for producing a carbon sheet. Herein, the density of the carbon sheet can be determined by dividing the areal weight (mass per unit area) of the carbon sheet, which is measured using an electronic balance, by the thickness of the carbon sheet in a state of being compressed at a pressure of 0.15 MPa. In the present invention, the binding material is a material that serves to bind carbon fibers, and examples thereof include resin compositions and carbides thereof.

A method suitable for producing the carbon sheet of the present invention will now be described in detail with carbon paper, which includes a carbon fiber papermaking substrate as a porous material, as a representative example.

<Porous Material>

Examples of the carbon fiber include polyacrylonitrile (PAN)-based, pitch-based and rayon-based carbon fibers. Among them, a PAN-based carbon fiber or a pitch-based carbon fiber is preferably used in the present invention because of its excellent mechanical strength.

In the carbon fiber in the carbon sheet of the present invention and the porous material such as a papermaking substrate to be used for obtaining the carbon sheet, the mean diameter of monofilaments is preferably within the range of 3 to 20 µm, more preferably within the range of 5 to 10 µm. When the mean diameter of monofilaments is 3 µm or more, the pore diameter increases, and the water removal performance is improved, so that flooding can be suppressed easily. Meanwhile, when the mean diameter of monofilaments is 20 µm or less, the thickness of the carbon sheet is easily controlled to fall within a preferred range as described below, which is preferred.

In the carbon fiber to be used in the present invention, the mean length of monofilaments is preferably within the range of 3 to 20 mm, more preferably within the range of 5 to 15 mm. When the mean length of monofilaments is 3 mm or more, a carbon sheet having excellent mechanical strength, electrical conductivity and thermal conductivity can be obtained. Meanwhile, when the mean length of monofilaments is 20 mm or less, dispersibility of the carbon fiber in papermaking is improved, so that a uniform carbon sheet can be obtained.

The mean diameter and mean length of monofilaments in the carbon fiber are usually measured by directly observing the carbon fiber as a raw material, and can also be measured by observing the carbon sheet.

The carbon fiber papermaking substrate formed by papermaking as one form of the porous material to be used for obtaining the carbon sheet is preferably in the form of a sheet in which a carbon fiber is randomly dispersed in a two-dimensional plane, in order to maintain the in-plane electrical conductivity and thermal conductivity to be isotropic. Papermaking of the carbon fiber in preparation of the carbon fiber papermaking substrate may be performed once, or performed multiple times in a laminated form.

In the present invention, it is preferred that in formation of a carbon sheet in a desired thickness, the carbon sheet be continuously formed in one process for preventing internal, delamination of the carbon sheet. When the carbon sheet is thickly formed by a method in which a process of papermaking is carried out multiple times, a discontinuous surface is formed in a thickness direction, so that when the carbon sheet is bent, stresses may be concentrated, leading to internal delamination.

Specifically, for the mean diameter of monofilaments in the carbon fiber, the ratio of the mean diameter of monofilaments in the carbon fiber which is determined at one surface of the carbon sheet to the mean diameter of monofilaments in the carbon fiber which is determined at the other surface of the carbon sheet is preferably 0.5 or more and 1.0 or less for preventing internal delamination. Herein, when the mean diameters are equal to each other, the ratio is 1.0, and when the mean diameters are different from each other, the ratio is a ratio of the smaller mean diameter to the larger mean diameter.

<Impregnation of Resin Composition>

In preparation of the carbon sheet of the present invention, a porous material containing a carbon fiber, such as a carbon fiber papermaking substrate, is impregnated with a resin composition that serves as a binding material.

As a method for impregnating a resin composition as a binding material into a porous material including a carbon fiber, a method of dipping a porous material into a resin composition-containing solution, a method of coating a porous material with a resin composition-containing solution, a method of laminating and bonding a porous material to a film composed of a resin composition, or the like can be employed. Among them, a method of dipping a porous material into a resin composition-containing solution is preferably employed because of its excellent productivity. A carbon fiber-containing porous material impregnated with a resin composition that serves as a binding material may be referred to as a "prepreg".

In the carbon sheet of the present invention, a layer having the largest filling rate under compression is the layer 2, and the filling rates of the layer 2, the layer 3, the layer 4, the layer 5 and the layer 6 under compression satisfy the relationship of: the layer 2 has the largest filling rate, and the layer 3 has the second largest filling rate. The carbon sheet of the present invention can be obtained by impregnating a resin composition into a porous material in such a manner that the layer 2 has the largest amount of the resin composition impregnated, and further the layer 3 has the second largest amount of the resin composition impregnated among the layer 2, the layer 3, the layer 4, the layer 5 and the layer 6. Thus, by uniformly impregnating a resin composition as a binding material into the whole of a carbon fiber-containing papermaking substrate by dipping or the like, and then removing an excess amount of the adhered resin composition from one surface before drying, the amount of the resin composition in the thickness direction of the carbon sheet is controlled and distributed, so that the filling rate of each layer can be controlled.

As one example, a resin composition-containing solution can be suctioned from one surface of a carbon fiber papermaking substrate after the carbon fiber papermaking substrate is dipped into the resin composition-containing solution and before the carbon fiber papermaking substrate is dried, the resin-containing solution can be removed from one surface of the carbon fiber papermaking substrate by air blowing, or a squeeze roll can be run over only one surface of the carbon fiber papermaking substrate. Therefore, in the carbon sheet, it is possible to control the amount of the binding material so that the layer 2 has the largest amount of the binding material, and the layer 3 has the second largest amount of the binding material among the layer 2, the layer 3, the layer 4, the layer 5 and the layer 6. Since a solvent in the resin composition is volatilized from the surface in a drying process, a larger amount of the resin composition is distributed to the surface easily. However, by controlling the removal amount of the resin composition properly from one surface of the carbon fiber papermaking substrate, in the carbon sheet, the amount of the binding material can be consequently changed such that the layer 2 has the largest amount of the binding material, and the layer 3 has the second largest amount of the binding material among the layer 2, the layer 3, the layer 4, the layer 5 and the layer 6.

The resin composition to be used in production of a prepreg is preferably a resin composition carbonized on baking to yield a binding material that is an electrically conductive carbide, and as required, may contain additives such as a carbon powder and a surfactant.

Examples of the resin constituting the resin component in the resin composition to be used in production of a prepreg include thermosetting resins such as phenolic resins, epoxy resins, melamine resins and furan resins. Among them, a phenolic resin is preferably used because of its high carbonization yield.

Further, as an additive to be added to a resin component as required, a carbon powder can be used as a resin component in the resin composition to be used in production of a prepreg, for the purpose of improving the mechanical properties, electrical conductivity and thermal conductivity of the carbon sheet. Herein, for the carbon powder, a carbon black such as furnace black, acetylene black, lamp black or thermal black, a graphite such as scaly graphite, scale-like graphite, earthy graphite, artificial graphite, expanded graphite or flaky graphite, a carbon nanotube, linear carbon, a milled fiber of carbon fiber or the like can be used.

As the resin composition to be used in production of a prepreg, a resin component obtained by the above-mentioned constitution can be used as it is, and the resin composition may also contain, as required, a variety of solvents for the purpose of improving impregnation property into a porous material such as a carbon fiber papermaking substrate. Herein, as the solvent, methanol, ethanol, isopropyl alcohol or the like can be used.

In impregnation of the resin composition, the porous material is preferably impregnated with the resin composition in such a manner that the amount of the resin component is 30 to 400 parts by mass, more preferably 50 to 300 parts by mass based on 100 parts by mass of the carbon fiber in the prepreg. When the amount of the resin component based on 100 parts by mass of the carbon fiber in the prepreg is 30 parts by mass or more, the carbon sheet has excellent mechanical properties, electrical conductivity and thermal conductivity. Meanwhile, when the amount of the resin component based on 100 parts by mass of the carbon fiber in the prepreg is 400 parts by mass or less, the carbon sheet has excellent gas diffusivity in an in-plane direction and excellent gas diffusivity in a thickness direction.

<Lamination and Annealing>

In the present invention, after a prepreg in which a porous material such as a carbon fiber papermaking substrate is impregnated with a resin composition is formed, the prepreg can be laminated and/or annealed prior to carbonization.

In the present invention, a plurality of prepregs can be laminated in order to allow the carbon sheet to have a prescribed thickness. In this case, a plurality of prepregs having the same properties can be laminated, or a plurality of prepregs having different properties can be laminated. Specifically, it is possible to laminate a plurality of prepregs that are different in terms of the mean diameter and the mean length of monofilaments in the carbon fiber, the areal weight of the carbon fiber in a porous material such as a carbon fiber papermaking substrate to be used in preparation of the prepreg, the amount of the impregnated resin component, and the like.

Meanwhile, lamination of a plurality of prepregs causes formation of a discontinuous surface in a thickness direction, so that internal separation may occur, and therefore in the present invention, it is desirable that rather than laminating a plurality of porous materials such as carbon fiber papermaking substrates, only one porous material be subjected to annealing.

In order to increase the viscosity of the resin composition in the prepreg or partially cross-link the resin composition, the prepreg can be subjected to annealing. As an annealing method, a method of blowing hot air against the prepreg, a method of heating the prepreg sandwiched between hot platens of a press apparatus, a method of heating the prepreg sandwiched between continuous belts or the like can be employed.

<Carbonization>

In the present invention, a porous material such as a carbon fiber papermaking substrate is impregnated with a resin composition to obtain a prepreg, and the prepreg is then baked in an inert atmosphere for carbonizing the resin composition. For this baking, a batch-type heating furnace or a continuous heating furnace can be used.

The highest temperature in the baking is preferably within the range of 1300 to 3000° C. When the highest temperature is 1300° C. or more, carbonization of the resin component in the prepreg is facilitated, so that the carbon sheet attains excellent electrical conductivity and thermal conductivity. Meanwhile, when the highest temperature is 3000° C. or less, the operating cost of the heating furnace is reduced.

In the present invention, a porous material such as a carbon fiber papermaking substrate which is impregnated with a resin composition and then carbonized may be referred to as a "baked carbon fiber". The carbon sheet means a baked carbon fiber, and both the baked carbon fiber before being subjected to a hydrophobic treatment and the baked carbon fiber after being subjected to a hydrophobic treatment correspond to the carbon sheet.

<Method for Measuring Filling Rates of Layers 1 to 6>

The filling rates of layers 1 to 6 are obtained through observation with a scanning electron microscope under compression. The thickness of each layer at 0.15 MPa is measured in advance, and a cross-section of a carbon sheet provided with a clearance equal to the value of the thickness and clipped with a compression tool is observed with a scanning electron microscope. By subjecting only the cross-section portion of the carbon sheet in the obtained image to image processing, and dividing the image into six equal parts in the thickness direction, the filling rate of a specific layer can be determined.

The filling rate of a layer at a predetermined position in the thickness direction of the carbon sheet is determined in the following manner. Using "J-trim" that is an image processing program, an image at the position in the cross-section observation image is extracted, and then divided in 256 stages between the maximum and the minimum of lightness in terms of luminance, a portion at the 128th grayscale stage from the minimum is defined as a threshold, and binarization is performed. The ratio of the area of a lighter binarized part in the total area is an apparent filling rate of a surface at a predetermined position. A value obtained by dividing the apparent filling rate of a layer at the predetermined position by the bulk filling rate of the carbon sheet is a filling rate under compression. The bulk filling rate can be determined from the ratio of a bulk density to a true density.

The one-measurement magnification for calculating a filling rate under compression is not particularly limited as long as the thickness direction of the carbon sheet is included within a measurement image, and a carbon fiber that forms the carbon sheet is discriminable, but a plurality of measurements are made so that the total of the through-plane-direction widths of measurement visual fields for calculating a filling rate under compression is 20 mm or more, and an average value of the measurements is determined to obtain a filling rate of the layer under compression.

The scanning electron microscope to be used in the measurement is SU8010 manufactured by Hitachi High-Tech Fielding Corporation, or its equivalent apparatus. In examples described below, for determining a filling rate of a surface with the measurement magnification set to 50 and the width of the measurement visual field set to 2.54 mm, the number of measurements in determination of a filling rate of one surface is set to 10.

Herein, the bulk density is determined by dividing the areal weight of the carbon sheet by the thickness of the carbon sheet at a pressure of 0.15 MPa.

The true density pt is calculated by the following equation from a true volume $V_t$ (cm³) determined by pycnometry and a mass $M_t$ (g) of the sample used for the measurement.

$$\rho_t(g/cm^3) = M_t/V_t$$

The device to be used in the measurement of the true volume $V_t$ (cm³) is a pycnometer, MicroUltrapyc 1200e manufactured by Quantachrome Instruments, or its equivalent apparatus. In the measurement, the sample is filled into the cell so that the rate of the true volume $V_t$ to the cell volume is 10% or more.

<Method for Measuring Surface Coverage of Surface 6>

The surface coverage of the surface 6 is obtained by taking a photograph of one surface of the carbon sheet at a magnification of 20 times under an optical microscope. In photographing, epi-illumination is used, an image is divided in 256 stages between the maximum and the minimum of lightness in terms of luminance, a portion at the 200 grayscale stage from the minimum is defined as a valley of a histogram, and photographs are taken. Using "J-trim" that is an image processing program, the obtained image is divided in 256 stages between the maximum and the minimum of lightness in terms of luminance, a portion at the 200th grayscale stage from the minimum is defined as a threshold, and binarization is performed. The ratio of the area of a lighter binarized part in the total area is a surface coverage of the surface.

The optical microscope to be used in the measurement is M205C manufactured by Leica Microsystems or its equivalent apparatus, and photographs are taken under the following conditions: the number of measurements in determination of a surface coverage of one surface: 10 times, exposure time: 20 ms, gain: 1.0, gamma: 1.0, illumination: 50%, and diaphragm: fully opened.

<Hydrophobic Treatment>

In the present invention, it is preferred that the baked carbon fiber be subjected to a hydrophobic treatment for the purpose of improving water removal performance. The hydrophobic treatment can be performed by coating the baked carbon fiber with a hydrophobic material and subsequently annealing the coated baked carbon fiber. By performing the hydrophobic treatment, a carbon sheet containing a hydrophobic material as a binding material can be obtained.

As the hydrophobic material, a fluorine-based polymer is preferably used because of its excellent corrosion resistance. Examples of the fluorine-based polymer include polytetrafluoroethylene (PTFE), tetrafluoroethylene-hexafluoro propylene copolymers (FEP), and tetrafluoroethylene-perfluoroalkylvinyl ether copolymers (PFA).

In the carbon sheet of the present invention, when a surface included in the layer 6 is a surface 6, the sliding angle of water at the surface 6 is preferably 40 degrees or less. When a surface included in the layer 1 is a surface 1, the gas diffusion electrode substrate of the present invention can be obtained by forming a microporous layer on the surface 1 side of the carbon sheet of the present invention. In a fuel cell including the gas diffusion electrode substrate, the surface 6 of the carbon sheet is on the bipolar plate side. Good water removal performance from the carbon sheet to the bipolar plate can be obtained by setting the sliding angle at the surface 6 to 40 degrees or less. The sliding angle at the surface 6 is preferably as small as possible, and the best water removal performance can be achieved at a sliding angle of 1 degree.

As a method for controlling the sliding angle at the surface 6 to 40 degrees or less, mention may be made of a method of subjecting a baked carbon fiber to a hydrophobic treatment. In annealing in the hydrophobic treatment step, the hydrophobic material is melted, and thus has a low viscosity, so that the hydrophobic material can be uniformly adhered to the surface of the carbon fiber in the carbon sheet, and the sliding angle of water can be kept at 40 degrees or less to improve the hydrophobicity of the carbon sheet.

The melting point of the hydrophobic material to be used in the hydrophobic treatment is preferably 200° C. or more and 320° C. or less, more preferably 250° C. or more and 310° C. or less. As a type of the hydrophobic material that satisfies the above-mentioned requirement, mention is made of FEP or PFA. By using the above-mentioned material as a hydrophobic material, the sliding angle of water at the surface 6 can be made 40 degrees or less, and therefore the water removal performance of the carbon sheet can be considerably enhanced, so that accumulation of water in the carbon sheet subjected to the hydrophobic treatment can be reduced, and therefore gas diffusivity can be considerably improved. Thus, fuel cell performance is considerably improved.

The coating amount of the hydrophobic material in the hydrophobic treatment is preferably 1 to 50 parts by mass, more preferably 2 to 40 parts by mass based on 100 parts by mass of the baked carbon fiber. When the coating amount of the hydrophobic material is 1 part by mass or more based on 100 parts by mass of the baked carbon fiber, the carbon sheet has excellent water removal performance easily. Meanwhile, when the coating amount of the hydrophobic material is 50 parts by mass or less based on 100 parts by mass of the baked carbon fiber, the carbon sheet has excellent electrical conductivity easily.

[Gas Diffusion Electrode Substrate]

The gas diffusion electrode substrate of the present invention will now be described.

When a surface included in the layer 1 is a surface 1, the gas diffusion electrode substrate of the present invention has a microporous layer on the surface 1 of the carbon sheet of the present invention.

<Formation of Microporous Layer>

A microporous layer as one of the constituent elements of the gas diffusion electrode substrate of the present invention will now be described.

The carbon sheet of the present invention can be used as a gas diffusion electrode substrate by forming the microporous layer on one surface of the carbon sheet. The gas diffusion electrode substrate of the present invention has the microporous layer on the surface 1 side of the carbon sheet. When the gas diffusion electrode substrate has the microporous layer on the surface 1 side, the pore diameter decreases in the order of the layer 1, the layer 2 and the layer 3 into which the microporous layer has penetrated, thereby good water removal performance can be obtained.

The areal weight of the microporous layer is not particularly limited, but it is preferably within the range of 10 to 35 $g/m^2$, more preferably 30 $g/m^2$ or less, still more preferably 25 $g/m^2$ or less. The areal weight of the microporous layer is preferably 14 $g/m^2$ or more, more preferably 16 $g/m^2$ or more.

When the areal weight of the microporous layer is 10 $g/m^2$ or more, one surface of the carbon sheet can be covered with the microporous layer, and back-diffusion of generated water is further promoted, so that dry-out of the electrolyte membrane is suppressed more easily. When the areal weight of the microporous layer is 35 $g/m^2$ or less, water removal performance is further improved, and flooding is suppressed more easily.

In the present invention, it is preferred that the microporous layer contain a filler. As the filler, a carbon powder is preferred. Examples of the carbon powder include carbon blacks such as furnace black, acetylene black, lamp black and thermal black, graphites such as scaly graphite, scale-like graphite, earthy graphite, artificial graphite, expanded graphite and flaky graphite, carbon nanotubes, linear carbon and milled fibers of carbon fiber. Among them, for the carbon powder as a filler, a carbon black is more preferably used, and acetylene black is preferably used because the content of impurities is low.

In the present invention, the microporous layer contains a carbon powder, and the carbon powder includes linear carbon having an aspect ratio of 30 to 5000, whereby penetration of a filler-containing coating solution as a precursor of the microporous layer into the carbon sheet can be properly suppressed to improve gas diffusivity and water removal performance in an in-plane direction, so that flooding can be suppressed, and further, a microporous layer having a sufficient thickness is formed on a surface layer of the carbon sheet to promote back-diffusion of generated water, so that dry-out can be suppressed.

In the present invention, it is preferred that the microporous layer contain a hydrophobic material from the viewpoint of promoting removal of water. In particular, a fluorine-based polymer is preferably used as the hydrophobic material because of its excellent corrosion resistance. Examples of the fluorine-based polymer include polytetrafluoroethylene (PTFE), tetrafluoroethylene-hexafluoro propylene copolymers (FEP), and tetrafluoroethylene-perfluoroalkylvinyl ether copolymers (PFA).

The microporous layer can be formed by coating one surface of the carbon sheet with the coating solution containing the filler (filler-containing coating solution).

The filler-containing coating solution may contain a dispersion medium such as water or an organic solvent, and may contain a dispersant such as a surfactant. The dispersion medium is preferably water, and a nonionic surfactant is preferably used as the dispersant. The filler-containing coating solution may contain a filler such as a variety of carbon powders and a hydrophobic material as described above.

Coating of the carbon sheet with the filler-containing coating solution can be performed using a variety of commercially available coating apparatuses. As a coating system, a coating system such as screen printing, rotary screen printing, spraying, intaglio printing, gravure printing, die coating, bar coating or blade coating can be employed. The coating methods exemplified above are presented for the illustration purpose only, and the coating method is not necessarily restricted thereto.

It is preferred to dry the coating solution at a temperature of 80 to 180° C. after coating the carbon sheet with the filler-containing coating solution. That is, the coated matter is placed in a dryer whose temperature is set at 80 to 180° C. and dried for 5 to 30 minutes. The drying air volume may be appropriately decided, but rapid drying may induce micro cracks in the surface. It is preferred that after the coated matter is dried, the coated matter be placed in a muffle furnace, a baking furnace or a high-temperature drying furnace, and heated preferably at a temperature of 300 to 380° C. for 5 to 20 minutes to melt the hydrophobic material, so that fillers such as carbon powders are bonded together into a binder to form the microporous layer.

[Wound Body]

The wound body of the present invention is the carbon sheet of the present invention wound up, or the gas diffusion electrode substrate of the present invention wound up. Herein, the wound body is the wound carbon sheet or the wound gas diffusion electrode substrate having a length of 10 m or more. The length of the wound carbon sheet or the wound gas diffusion electrode substrate is not particularly limited, but is preferably 1000 m or less because the resultant wound body becomes too heavy if it is too long. It is preferred that the carbon sheet or the gas diffusion electrode substrate be formed into a wound body, because the process of forming a fuel cell can be made continuous and the production cost is reduced.

[Membrane Electrode Assembly]

In the present invention, a membrane electrode assembly can be formed by joining the above-mentioned gas diffusion electrode substrate to at least one surface of a solid polymer electrolyte membrane having a catalyst layer on both surfaces. At this time, when the macroporous layer of the gas diffusion electrode substrate is arranged on the catalyst layer side, back-diffusion of the generated water is more likely to occur, and also the contact area between the catalyst layer and the gas diffusion electrode substrate is increased, so that the contact electrical resistance can be reduced.

[Fuel Cell]

The fuel cell of the present invention includes the gas diffusion electrode substrate of the present invention. The fuel cell of the present invention has bipolar plates on both sides of the membrane electrode assembly described above. That is, the fuel cell is constituted by arranging bipolar plates on both sides of the membrane electrode assembly described above. Usually, a polymer electrolyte fuel cell is constituted by laminating a plurality of such membrane electrode assemblies that are sandwiched between bipolar plates from both sides via a gasket. The catalyst layer is composed of a layer containing a solid polymer electrolyte and a catalyst-carrying carbon. As the catalyst, platinum is usually used. In a fuel cell in which a carbon monoxide-containing reformed gas is supplied to the anode side, it is preferred to use platinum and ruthenium as catalysts at the anode side. As the solid polymer electrolyte, it is preferred to use a perfluorosulfonic acid-based polymer material having high protonic conductivity, oxidation resistance, and heat resistance. The constitutions themselves of the above-mentioned fuel cell unit and fuel cell are well known.

EXAMPLES

The carbon sheet and the gas diffusion electrode substrate of the present invention will now be described in detail by ways of examples. The materials, the methods for producing a carbon sheet and a gas diffusion electrode substrate, and the method for evaluating battery performance of fuel cells that are used in the examples are described below.

<Preparation of Carbon Sheet>

Preparation of 140 μm-Thick Carbon Sheet

Polyacrylonitrile-based carbon fiber "TORAYCA" (registered trademark) T300 (mean diameter of monofilaments: 7 μm) manufactured by Toray Industries, Inc. was cut into a short fiber mean length of 12 mm and dispersed in water, and paper was continuously made by a wet papermaking method. Further, the paper was coated with a 10% by mass aqueous solution of polyvinyl alcohol as a binder and then dried to prepare a carbon fiber papermaking substrate having a carbon fiber areal weight of 30.0 g/m$^2$. The coating amount of the polyvinyl alcohol was 22 parts by mass based on 100 parts by mass of the carbon fiber papermaking substrate.

Next, using a resin composition obtained by mixing a resol type phenolic resin and a novolak type phenolic resin at a 1:1 mass ratio as a thermosetting resin, scaly graphite (mean particle size 5 μm) as a carbon powder and methanol as a solvent, the materials were mixed at a ratio of thermosetting resin/carbon powder/solvent=10 parts by mass/5 parts by mass/85 parts by mass, and the resulting mixture was stirred for 1 minute using an ultrasonic dispersion apparatus to obtain a uniformly dispersed resin composition.

Next, the carbon fiber papermaking substrate was cut into a size of 15 cm×12.5 cm and horizontally dipped into a resin composition impregnation liquid filled into an aluminum tray, and was sandwiched between rolls, and squeezed to impregnate the resin composition. Herein, the two rolls were arranged horizontally with a fixed clearance provided therebetween, and the carbon fiber papermaking substrate was lifted upward vertically to adjust the adhesion amount of the resin composition as a whole. Before the resin composition impregnation liquid adhered to the carbon fiber papermaking substrate was dried, paper was pressed against one surface of the carbon fiber papermaking substrate to remove the resin composition from the surface, and the adhesion amount of resin in the thickness direction was adjusted. Thereafter, the carbon fiber papermaking substrate was heated and dried at a temperature of 100° C. for 5 minutes to prepare a prepreg. Next, the prepreg was annealed at a temperature of 180° C. for 5 minutes while being pressed with a pressing machine with flat plates. When pressing the prepreg, the space between the upper and lower press plates was adjusted by arranging a spacer in the pressing machine with flat plates such that the annealed prepreg had a thickness of 180 μm.

A substrate obtained by annealing the prepreg was introduced into a heating furnace having the highest temperature of 2400° C., in which a nitrogen gas atmosphere was maintained, to obtain a carbon sheet composed of a baked carbon fiber.

The carbon sheet prepared as described above was dipped into a water dispersion liquid of PTFE resin ("POLYFLON" (registered trademark) PTFE Dispersion D-201C (manufactured by DAIKIN INDUSTRIES, Ltd.)) or a water dispersion liquid of FEP resin ("NEOFLON" (registered trademark) FEP Dispersion ND-110 (manufactured by DAIKIN INDUSTRIES, Ltd.)) to impregnate the baked carbon fiber with the hydrophobic material. Thereafter, the carbon sheet was heated and dried in a drying furnace at a temperature of 100° C. for 5 minutes to prepare a carbon sheet subjected to a hydrophobic treatment so that the hydrophobic material would be uniformly adhered to the surface of the carbon fiber. In the drying, the carbon sheet was vertically arranged, and the vertical direction was changed every 1 minute. The water dispersion liquid of the hydrophobic material was diluted to an appropriate concentration so as to add 5 parts by mass of the hydrophobic material to 95 parts by mass of the carbon sheet in terms of the amount after drying.

<Preparation of Gas Diffusion Electrode Substrate>
[Materials]
Carbon powder A: acetylene black: "DENKA BLACK" (registered trademark) (manufactured by Denka Company Limited)
Carbon powder B: linear carbon: "VGCF" (registered trademark) (manufactured by SHOWA DENKO K.K.), aspect ratio: 70
Material C: hydrophobic material: PTFE resin ("POLYFLON" (registered trademark) PTFE Dispersion D-1E (manufactured by DAIKIN INDUSTRIES, Ltd.) that is a water dispersion liquid containing 60 parts by mass of PTFE resin)
Material D: surfactant "TRITON" (registered trademark) X-100 (manufactured by Nacalai Tesque)

A filler-containing coating solution was prepared by mixing the above-mentioned materials using a disperser. One surface of the carbon sheet subjected to a hydrophobic treatment was coated with the filler-containing coating solution in a planar form using a slit die coater, and heating was then performed at a temperature of 120° C. for 10 minutes, and then at a temperature of 380° C. for 10 minutes. In this way, a microporous layer was formed on the carbon sheet subjected to a hydrophobic treatment, so that a gas diffusion electrode substrate was prepared. The filler-containing coating solutions used are filler-containing coating solutions prepared using a carbon powder, a hydrophobic material, a surfactant and purified water and adjusted so as to have compositions of the carbon coating solutions with the addition amounts described in terms of parts by mass as shown in Tables 1 and 2. The addition amounts of the material C (PTFE resin) shown in Tables 1 and 2 represent the addition amounts of PTFE resin itself rather than the addition amounts of the water dispersion liquid of PTFE resin.

<Evaluation of Anti-Flooding Characteristic>

A catalyst solution was prepared by sequentially adding 1.00 g of platinum-supported carbon (manufactured by Tanaka Kikinzoku Kogyo K.K., platinum supporting amount: 50% by mass), 1.00 g of purified water, 8.00 g of "Nafion" (registered trademark) solution (manufactured by Aldrich, "Nafion" (registered trademark), 5.0% by mass) and 18.00 g of isopropyl alcohol (manufactured by Nacalai Tesque).

Then, a "NAFLON" (registered trademark) PTFE tape "TOMBO" (registered trademark) No. 9001 (manufactured by NICHIAS Corporation) which was cut into a size of 5 cm×5 cm was coated with the obtained catalyst solution using a spray and dried at ordinary temperature to prepare a PTFE sheet equipped with a catalyst layer having a platinum amount of 0.3 mg/cm². Subsequently, a solid polymer electrolyte membrane, "Nafion" (registered trademark) NRE-211CS (manufactured by DuPont) which was cut into a size of 8 cm×8 cm was sandwiched with two catalyst layer-equipped PTFE sheets. The resultant was pressed at a temperature of 130° C. for 5 minutes while being pressurized at 5 MPa using a pressing machine with flat plates, thereby transferring the respective catalyst layers onto the solid polymer electrolyte membrane. After pressing, the PTFE sheets were removed to prepare a catalyst layer-equipped solid polymer electrolyte membrane.

Next, the obtained catalyst layer-equipped solid polymer electrolyte membrane was sandwiched with two gas diffusion electrode substrates cut into a size of 5 cm×5 cm, and the resultant was pressed at a temperature of 130° C. for 5 minutes while being pressurized at 3 MPa using a pressing machine with flat plates, thereby preparing a membrane electrode assembly. It is noted here that the gas diffusion electrode substrate was arranged such that the surface having the microporous layer was in contact with the catalyst layer.

The obtained membrane electrode assembly was incorporated into a fuel cell evaluation unit cell to measure the voltage when the current density was changed. Herein, as a bipolar plate, a serpentine-type bipolar plate having one flow channel of 1.0 mm in each of channel width, channel depth and rib width was used. Further, the evaluation was carried out with non-pressurized hydrogen and non-pressurized air being supplied to the anode side and the cathode side, respectively.

For examining the anti-flooding characteristic, hydrogen and air were humidified using a humidification pot whose temperature was set at 40° C. The humidity at this time was 100%. The utilization ratios of hydrogen and atmospheric oxygen were set at 70 mol % and 40 mol %, respectively. The output voltage at a current density of 1.5 A/cm² was measured, and used as an index of the anti-flooding characteristic.

<Measurement of Areal Weight>

The areal weights of the carbon sheet and the gas diffusion electrode substrate were determined by dividing the mass of a sample cut into a 10-cm square by the area of the sample (0.01 m²).

<Measurement of Thickness>

A carbon sheet and a gas diffusion electrode substrate were placed on a smooth surface plate, and a difference in height between the case of presence of a measurement object and the case of absence of the measurement object was measured in a state in which a pressure of 0.15 MPa was applied. Samples were taken at 10 different parts, measured values of the difference in height were averaged, and the average thus obtained was defined as a thickness.

<Measurement of Mean Diameter in Monofilaments in Carbon Fiber>

The mean diameter of monofilaments in the carbon fiber was determined by taking a photograph of the carbon fiber on one surface of the carbon sheet at a magnification of 1000 times under a microscope such as a scanning electron microscope, randomly selecting 30 different monofilaments, measuring their diameters, and averaging the diameters. The mean diameter of monofilaments in the carbon fiber on the other surface of the carbon sheet was determined in the same manner as described above. As the scanning electron microscope, S-4800 manufactured by Hitachi, Ltd. or its equivalent product can be used. The mean diameters determined for the surface 1 and the surface 6 of the carbon sheet are shown in Tables 1 and 2.

Herein, the "mean diameter of monofilaments (surface 1/surface 6)" in Tables 1 and 2 shows the mean diameter of monofilaments in the carbon fiber which is determined for the surface 1 and the mean diameter of monofilaments in the carbon fiber which is determined for the surface 6.

<Measurement of Delamination Strength of Carbon Sheet>

The tensile test mode of "Autograph" (registered trademark) AGS-X manufactured by Shimadzu Corporation was used to measure the delamination strength of the layers of the carbon sheet. Double sided tape (NICETACK (registered trademark) for general use NW-20 manufactured by Nichiban Co., Ltd.) was attached to the sample contact surface (2.0 cm×2.0 cm) of upper and lower two sample mounting jigs attached to the tensile tester. A specimen of 2.24 cm×2.24 cm cut out from the carbon sheet was put on one sample mounting jig attached to the lower side of the tester. The tester was set to the compression mode, and the specimen was pressed with the other sample mounting jig attached to the upper side at 400 N (a pressure of 1 MPa) for 30 seconds. Then, the tester was set to the tensile test mode, and the upper-side sample mounting jig was raised at a speed of 0.5 mm/sec. The maximum stress applied at the time was regarded as the delamination strength (N) and was measured 10 times, and the mean value thereof was used.

Example 1

In accordance with the methods described in <Preparation of Carbon Sheet>, <Hydrophobic Treatment> and <Preparation of Gas Diffusion Electrode Substrate>, a gas diffusion electrode substrate including a 140 µm-thick porous carbon sheet as shown in Table 1 was obtained. The results are shown in Table 1. This carbon sheet exhibited a good anti-flooding characteristic of 0.35 V or more and a very good delamination strength of 75 N or more, and attained both an anti-flooding characteristic and suppression of delamination.

Example 2

In accordance with the methods described in <Preparation of Carbon Sheet>, <Hydrophobic Treatment> and <Preparation of Gas Diffusion Electrode Substrate>, a gas diffusion electrode substrate including a 140 µm-thick porous carbon sheet as shown in Table 1 was obtained. In this example, a large amount of a binding material was removed from the surface 6 side of the carbon sheet to change differences in filling rate between the layer 4, the layer 5 and the layer 6 from Example 1. The results are shown in Table 1. This carbon sheet exhibited a good anti-flooding characteristic of 0.40 V or more and a very good delamination strength of 75 N or more, and attained both an anti-flooding characteristic and suppression of delamination. The remarkable improvement of the anti-flooding characteristic may be because there were large differences in filling rate between the layer 4, the layer 5 and the layer 6 and the layer 2, leading to enhancement of water removal performance.

Example 3

In accordance with the methods described in <Preparation of Carbon Sheet>, <Hydrophobic Treatment> and <Preparation of Gas Diffusion Electrode Substrate>, a gas diffusion electrode substrate including a 140 µm-thick porous carbon sheet as shown in Table 1 was obtained. In this example, a large amount of a binding material was removed from the surface 6 side of the carbon sheet to decrease the filling rate of the layer 3 as compared to Example 2. The results are shown in Table 1. This carbon sheet exhibited a very good anti-flooding characteristic of 0.40 V or more and a good delamination strength of 70 N or more, and attained both an anti-flooding characteristic and suppression of delamination. The remarkable improvement of the anti-flooding characteristic may be because there were large differences in filling rate between the layer 4, the layer 5 and the layer 6 and the layer 2, and there was a large difference in filling rate between the layer 3 and the layer 2, leading to enhancement of water removal performance.

Example 4

In accordance with the methods described in <Preparation of Carbon Sheet>, <Hydrophobic Treatment> and <Preparation of Gas Diffusion Electrode Substrate>, a gas diffusion electrode substrate was prepared in the same manner as in Example 1 except that the hydrophobic material to be used for the hydrophobic treatment of the carbon sheet was changed to a polyfluoroethylene-polyfluoropropylene copolymer (FEP). A gas diffusion electrode substrate including a 140 µm-thick porous carbon sheet as shown in Table 1 was obtained. The results are shown in Table 1. This carbon sheet exhibited a very good anti-flooding characteristic of 0.40 V or more and a very good delamination strength of 75 N or more, and attained both an anti-flooding characteristic and suppression of delamination.

Example 5

In accordance with the methods described in <Preparation of Carbon Sheet>, <Hydrophobic Treatment> and <Preparation of Gas Diffusion Electrode Substrate>, a gas diffusion electrode substrate was prepared in the same manner as in Example 1 except that the composition of the microporous layer was changed. A gas diffusion electrode substrate including a 140 µm-thick porous carbon sheet as shown in Table 2 was obtained. The results are shown in Table 2. This carbon sheet exhibited a very good anti-flooding characteristic of 0.40 V or more and a very good delamination strength of 75 N or more, and this carbon sheet exhibited good fuel cell performance and a good bending amount, attained both an anti-flooding characteristic and inhibition of bending, and had a considerably improved anti-flooding characteristic.

Comparative Example 1

In the methods described in <Preparation of Carbon Sheet>, <Hydrophobic Treatment> and <Preparation of Gas Diffusion Electrode Substrate>, a resin composition was adhered to one surface of the carbon fiber papermaking substrate by gravure coating in impregnation of the resin composition into the carbon fiber papermaking substrate, and a gas diffusion electrode substrate including a 140 µm-thick porous carbon sheet as shown in Table 2 was obtained. The results are shown in Table 2. This carbon sheet exhibited a very good delamination strength of 75 N, but had an insufficient anti-flooding characteristic because the microporous layer did not penetrate easily into the carbon sheet, and an interface between the microporous layer and the carbon sheet was formed.

Comparative Example 2

A gas diffusion electrode substrate including a 140 µm-thick carbon sheet as shown in Table 2 was prepared according to the method of preparing the carbon sheet as shown in Example 1 except that, in <Preparation of Carbon Sheet>, on adhesion of the resin of the prepreg, the prepreg was prepared by drying the carbon fiber papermaking substrate without the adjustment to remove the resin from one surface. The results are shown in Table 2. This carbon sheet suppressed delamination well, but had an insufficient anti-flooding characteristic.

Comparative Example 3

A gas diffusion electrode substrate including a 140 µm-thick carbon sheet as shown in Table 2 was prepared according to the method of preparing the carbon sheet as shown in Example 1 except that, in <Preparation of Carbon Sheet>, on adhesion of the resin of the prepreg, the prepreg was prepared by drying the carbon fiber papermaking substrate without the adjustment to remove the resin from one surface. The results are shown in Table 2. This carbon sheet exhibited an excellent anti-flooding characteristic, but insufficiently suppressed delamination.

TABLE 1

|  |  | Example 1 | Example 2 | Example 3 | Example 4 |
|---|---|---|---|---|---|
| Carbon sheet | Thickness [μm] | 140 | 140 | 140 | 140 |
|  | Areal weight [g/m²] | 48 | 46 | 44 | 48 |
|  | Mean diameter of monofilaments (surface 1/surface 6) [μm] | 7.0/7.0 | 7.0/7.0 | 7.0/7.0 | 7.0/7.0 |
|  | Type of hydrophobic material | PTFE | PTFE | PTFE | FEP |
|  | Filling rate of layer 1 (before hydrophobic treatment) [%] | 19.4 | 18.5 | 18.8 | 19.4 |
|  | Filling rate of layer 2 (before hydrophobic treatment) [%] | 25.1 | 24.7 | 24.5 | 25.1 |
|  | Filling rate of layer 3 (before hydrophobic treatment) [%] | 23.7 | 22.4 | 21.2 | 23.7 |
|  | Filling rate of layer 4 (before hydrophobic treatment) [%] | 22.1 | 18.9 | 18.7 | 22.1 |
|  | Filling rate of layer 5 (before hydrophobic treatment) [%] | 17.3 | 18.3 | 17.7 | 17.3 |
|  | Filling rate of layer 6 (before hydrophobic treatment) [%] | 15.9 | 16.7 | 15.2 | 15.9 |
|  | Surface coverage of surface 6 [%] | 7.8 | 7.3 | 5.7 | 7.8 |
|  | Filling rate of layer 1 (after hydrophobic treatment) [%] | 20.3 | 19.3 | 19.7 | 20.2 |
|  | Filling rate of layer 2 (after hydrophobic treatment) [%] | 26.7 | 26.3 | 26.1 | 26.7 |
|  | Filling rate of layer 3 (after hydrophobic treatment) [%] | 25.1 | 23.8 | 22.5 | 24.9 |
|  | Filling rate of layer 4 (after hydrophobic treatment) [%] | 23.1 | 19.8 | 19.5 | 23.0 |
|  | Filling rate of layer 5 (after hydrophobic treatment) [%] | 18.1 | 19.1 | 18.4 | 18 |
|  | Filling rate of layer 6 (after hydrophobic treatment) [%] | 16.4 | 17.4 | 15.7 | 16.4 |
|  | Delamination strength [N] | 81 | 77 | 74 | 81 |
| Microporous layer | Carbon powder A | 7.0 | 7.0 | 7.0 | 7.0 |
|  | Carbon powder B | — | — | — | — |
|  | Material C | 2.5 | 2.5 | 2.5 | 2.5 |
|  | Material D | 14 | 14 | 14 | 14 |
|  | Purified water | 75.8 | 75.8 | 75.8 | 75.8 |
| Gas diffusion electrode substrate | Areal weight [g/m²] | 60 | 58 | 56 | 60 |
|  | Thickness [μm] | 161 | 160 | 159 | 160 |
| Anti-flooding characteristic | Output voltage [V] (Operating condition 40° C.) | 0.39 | 0.45 | 0.48 | 0.46 |

TABLE 2

|  |  | Example 5 | Comparative Example 1 | Comparative Example 2 | Comparative Example 3 |
|---|---|---|---|---|---|
| Carbon sheet | Thickness [μm] | 140 | 140 | 140 | 140 |
|  | Areal weight [g/m²] | 48 | 48 | 54 | 44 |
|  | Mean diameter of monofilaments (surface 1/surface 6) [μm] | 7.0/7.0 | 7.0/7.0 | 7.0/7.0 | 7.0/7.0 |
|  | Type of hydrophobic material | PTFE | PTFE | PTFE | PTFE |
|  | Filling rate of layer 1 (before hydrophobic treatment) [%] | 19.4 | 31.2 | 19.4 | 17.6 |
|  | Filling rate of layer 2 (before hydrophobic treatment) [%] | 25.1 | 28.7 | 26.4 | 22.9 |
|  | Filling rate of layer 3 (before hydrophobic treatment) [%] | 23.7 | 24.3 | 23.3 | 19.8 |
|  | Filling rate of layer 4 (before hydrophobic treatment) [%] | 22.1 | 17.6 | 23.3 | 19.8 |
|  | Filling rate of layer 5 (before hydrophobic treatment) [%] | 17.3 | 11.8 | 26.4 | 22.9 |
|  | Filling rate of layer 6 (before hydrophobic treatment) [%] | 15.9 | 10.3 | 19.4 | 17.6 |

TABLE 2-continued

|  |  | Example 5 | Comparative Example 1 | Comparative Example 2 | Comparative Example 3 |
|---|---|---|---|---|---|
|  | Surface coverage of surface 6 [%] | 7.8 | 5.4 | 16.5 | 10.8 |
|  | Filling rate of layer 1 (after hydrophobic treatment) [%] | 20.3 | 33.2 | 20.3 | 18.3 |
|  | Filling rate of layer 2 (after hydrophobic treatment) [%] | 26.7 | 30.4 | 28.1 | 24.4 |
|  | Filling rate of layer 3 (after hydrophobic treatment) [%] | 25.1 | 25.8 | 24.5 | 20.7 |
|  | Filling rate of layer 4 (after hydrophobic treatment) [%] | 23.1 | 18.4 | 24.5 | 20.7 |
|  | Filling rate of layer 5 (after hydrophobic treatment) [%] | 18.1 | 12.1 | 28.1 | 24.4 |
|  | Filling rate of layer 6 (after hydrophobic treatment) [%] | 16.4 | 10.4 | 20.3 | 18.3 |
|  | Delamination strength [N] | 81 | 82 | 80 | 54 |
| Microporous layer | Carbon powder A | — | 7.0 | 7.0 | 7.0 |
|  | Carbon powder B | 7.0 | — | — | — |
|  | Material C | 2.5 | 2.5 | 2.5 | 2.5 |
|  | Material D | 14 | 14 | 14 | 14 |
|  | Purified water | 75.8 | 75.8 | 75.8 | 75.8 |
| Gas diffusion electrode substrate | Areal weight [g/m$^2$] | 60 | 60 | 66 | 56 |
|  | Thickness [μm] | 161 | 164 | 160 | 159 |
| Anti-flooding characteristic | Output voltage [V] (Operating condition 40° C.) | 0.46 | 0.34 | 0.32 | 0.35 |

In the examples, the surface coverage was measured using the carbon sheet before being subjected to a hydrophobic treatment.

DESCRIPTION OF REFERENCE SIGNS

1: Carbon sheet
2: Surface 1
3: Surface 6
4: Layer 1
5: Layer 2
6: Layer 3
7: Layer 4
8: Layer 5
9: Layer 6
10: Microporous layer
11: Gas diffusion electrode substrate

The invention claimed is:

1. A porous carbon sheet comprising a carbon fiber and a binding material, wherein
the binding material has a concentration gradient in the thickness direction of the carbon sheet such that layers obtained by dividing the carbon sheet in a thickness direction into six equal parts under compression within a section extending from one surface to the other surface include a layer 1, a layer 2, a layer 3, a layer 4, a layer 5 and a layer 6 in this order from the layer including one surface to the layer including the other surface, a layer having the largest filling rate with the binding material under compression at a pressure of 0.15 MPa is the layer 2,
the filling rates of the layer 2, the layer 3, the layer 4, the layer 5 and the layer 6 under compression satisfy the relationship of: the layer 2 has the largest filling rate, and the layer 3 has the second largest filling rate, and
the filling rates of the layer 2, the layer 3, the layer 4, the layer 5 and the layer 6 under compression satisfy the relationship of: filling rate of layer 2>filling rate of layer 3>filling rate of layer 4>filling rate of layer 5>filling rate of layer 6, and
wherein the carbon sheet is prepared from one prepreg.

2. The carbon sheet according to claim 1, wherein the filling rate of the layer 2 is 10% or more and 50% or less.

3. The carbon sheet according to claim 1, having a difference in filling rate between the layer 2 and the layer 1 (filling rate of layer 2−filling rate of layer 1) of 5% or more.

4. The carbon sheet according to claim 1, having differences in filling rate between the layer 2 and each of the layers 4 to 6 (filling rate of layer 2−each of filling rates of layers 4 to 6) of each 5% or more.

5. The carbon sheet according to claim 1, having a difference in filling rate between the layer 2 and the layer 3 (filling rate of layer 2−filling rate of layer 3) of 3% or more.

6. The carbon sheet according to claim 1, wherein when a surface included in the layer 6 is a surface 6, the surface 6 has a surface coverage of 7% or less.

7. A gas diffusion electrode substrate, wherein the gas diffusion electrode substrate has a microporous layer on a surface 1 of a layer 1 of a porous carbon sheet comprising a carbon fiber and a binding material, wherein
the binding material has a concentration gradient in the thickness direction of the carbon sheet such that layers obtained by dividing the carbon sheet in a thickness direction into six equal parts under compression within a section extending from one surface to the other surface include the layer 1, a layer 2, a layer 3, a layer 4, a layer 5 and a layer 6 in this order from the layer including one surface to the layer including the other surface, a layer having the largest filling rate with the binding material under compression at a pressure of 0.15 MPa is the layer 2,
the filling rates of the layer 2, the layer 3, the layer 4, the layer 5 and the layer 6 under compression satisfy the relationship of: the layer 2 has the largest filling rate, and the layer 3 has the second largest filling rate, and
the filling rates of the layer 2, the layer 3, the layer 4, the layer 5 and the layer 6 under compression satisfy the relationship of: filling rate of layer 2>filling rate of layer 3>filling rate of layer 4>filling rate of layer 5>filling rate of layer 6.

8. A wound body, which is the carbon sheet according to claim 1 wound up.

9. A wound body, which is the gas diffusion electrode substrate according to claim 7 wound up.

10. A fuel cell comprising the gas diffusion electrode substrate according to claim 7.

* * * * *